US008145168B2

(12) United States Patent
Agawa (10) Patent No.: US 8,145,168 B2
(45) Date of Patent: Mar. 27, 2012

(54) WIRELESS TRANSCEIVER AND WIRELESS TRANSMISSION METHOD

(75) Inventor: Kenichi Agawa, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 774 days.

(21) Appl. No.: 12/243,255

(22) Filed: Oct. 1, 2008

(65) Prior Publication Data

US 2009/0088101 A1   Apr. 2, 2009

(30) Foreign Application Priority Data

Oct. 2, 2007 (JP) .................. 2007-259127

(51) Int. Cl.
*H04B 1/06* (2006.01)
(52) U.S. Cl. .................. 455/240.1; 455/127.2; 455/334; 375/345
(58) Field of Classification Search ............. 455/127.1, 455/127.2, 230, 232.1, 234.1, 240.1, 323, 455/324, 334; 375/345
See application file for complete search history.

(56) References Cited

U.S. PATENT DOCUMENTS

| 6,560,448 | B1 * | 5/2003 | Baldwin et al. | ............ | 455/234.1 |
| 7,257,385 | B2 | 8/2007 | Ono et al. | | |
| 2001/0049267 | A1 * | 12/2001 | Takalo et al. | .................. | 455/84 |
| 2004/0264608 | A1 | 12/2004 | Habuka et al. | | |

FOREIGN PATENT DOCUMENTS

JP    2005-20119    1/2005

OTHER PUBLICATIONS

Iason Vassiliou, et al., "A Single-Chip Digitally Calibrated 5.15-5.825-GHz 0.18-µm CMOS Transceiver for 802.11a Wireless LAN", IEEE Journal of Solid-State Circits, vol. 38, No. 12, Dec. 2003, pp. 2221-2231.

* cited by examiner

*Primary Examiner* — Nhan Le
(74) *Attorney, Agent, or Firm* — Oblon, Spivak, McClelland, Maier & Neustadt, L.L.P.

(57) ABSTRACT

A DC offset of a VGA is measured by selecting a ground contact of a switch. Then, the gain of the VGA is set at an appropriate value, monitoring contacts of the switch are successively selected, and the output values of an ADC for the respective cases are measured with the input to a DAC set at zero. Then, the DC offset of the VGA is removed, the DC offset value of each circuit block, such as DAC, in a transmitting part is calculated, and parameters are set so that the DC offset value of each circuit block is minimized.

17 Claims, 10 Drawing Sheets

WIRELESS TRANSCEIVER AND WIRELESS TRANSMISSION METHOD

CROSS REFERENCE TO RELATED APPLICATION

This application is based upon and claims the benefit of priority from the prior Japanese Patent Application No. 2007-259127 filed on Oct. 2, 2007; the entire contents of which are incorporated herein by reference.

BACKGROUND OF THE INVENTION

1. Field of the Invention

The present invention relates to a wireless transceiver that transmits and receives a signal by wireless and a wireless transmission method.

2. Description of the Related Art

In recent years, wireless communication systems have dramatically progressed, and compact wireless transceivers capable of transmitting and receiving signals by wireless have been provided.

For example, Japanese Patent Application Laid-Open Publication No. 2005-20119 discloses a wireless communication system that has a direct-current (DC) offset canceling function and a gain adjusting function that are used in signal reception.

According to Japanese Patent Application Laid-Open Publication No. 2005-20119, DC offsets of the amplifier that amplifies the received signal are previously detected for various set gains to determine offset canceling values, the offset canceling values are stored in a memory, and an appropriate offset canceling value is read out from the memory to cancel the DC offset of the amplifier when signal reception is started or the gain is changed.

However, DC offset canceling is important not only in reception but also in transmission.

To precisely cancel or reduce the DC offset of a transmitting part, DC offsets of a plurality of circuit blocks (having different functions) in the transmitting part are desired to be canceled or reduced.

Figure 9:
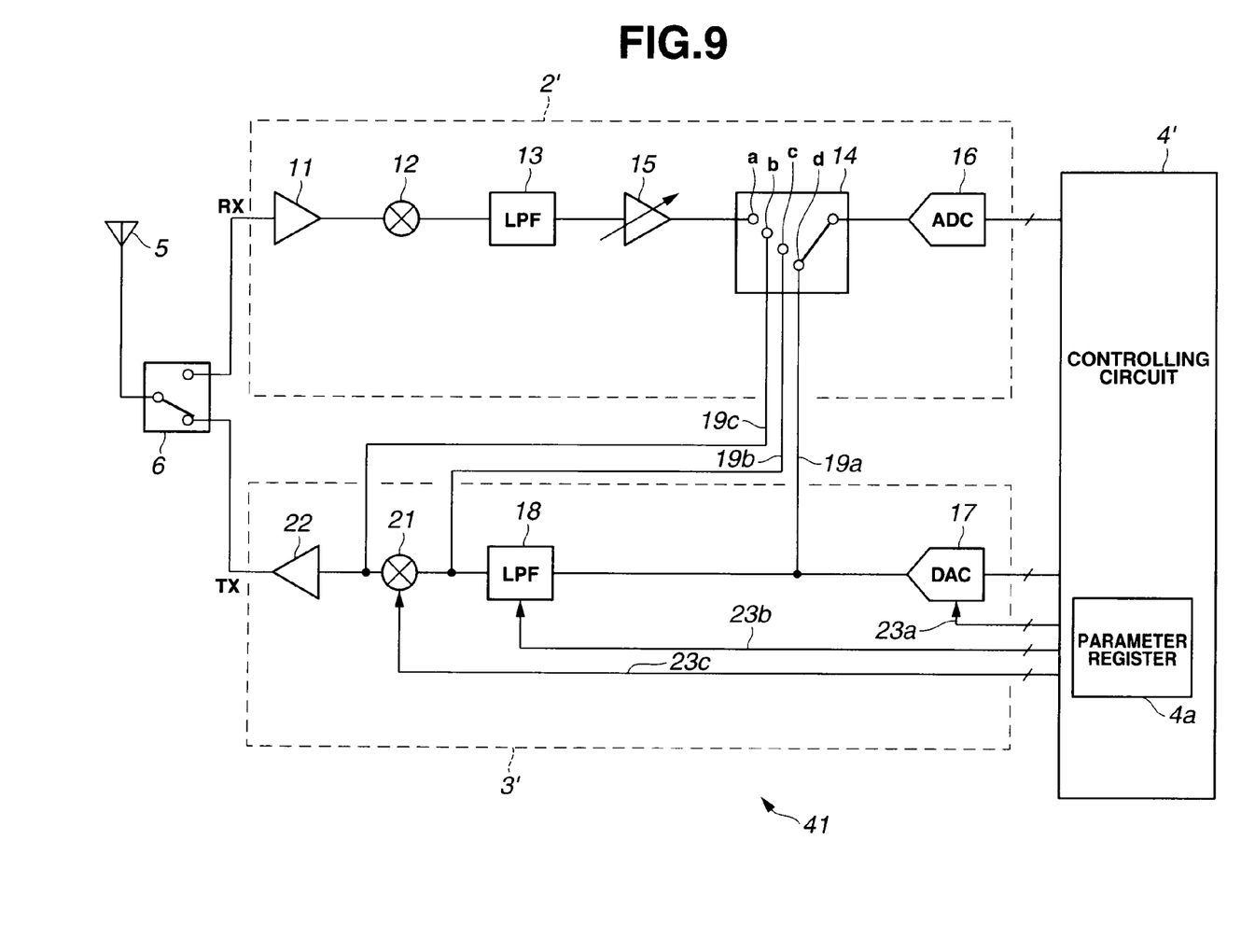
FIG. 9 is a block diagram showing a configuration of a conventional wireless transceiver.

Furthermore, in IEEE Journal of Solid-State Circuits, Vol. 38, No. 12, 2003, "A single-Chip Digitally Calibrated 5.15-5.825-GHz 0.18-µm CMOS Transceiver for 802.11a Wireless LAN", a wireless transceiver 41 shown in FIG. 9 is disclosed.

The wireless transceiver 41 has a receiving part 2' that receives a signal transmitted by wireless, a transmitting part 3' that transmits a signal by wireless, and a digital controlling circuit (referred to simply as controlling circuit hereinafter) 4' that controls the receiving part 2' and the transmitting part 3'.

Furthermore, the wireless transceiver 41 has an antenna 5 at which a transmission signal produced by the transmitting part 3' is externally transmitted via a radio wave and a radio wave externally transmitted is received, and a switch 6 that switchably connects the antenna 5 to the transmitting part 3' or the receiving part 2'.

A signal received at the antenna 5 (RX in FIG. 9) is amplified by a low noise amplifier (abbreviated as LNA hereinafter) 11, and then input to a receiving mixer 12. The receiving mixer 12 also receives a local oscillation signal (not shown) and down-converts the received signal by mixing with the local oscillation signal. The signal down-converted by the receiving mixer 12 is input to a low pass filter (abbreviated as LPF hereinafter) 13. The LPF 13 extracts an intermediate frequency signal component in a lower frequency range.

The intermediate frequency signal is input to a variable gain amplifying circuit (referred to also as variable gain amplifier and abbreviated as VGA hereinafter) 15. The signal is amplified by the VGA 15, and then input to an analog-to-digital converting circuit (abbreviated as ADC hereinafter) 16 via a contact a of a switch 14.

The digital signal produced by analog-to-digital conversion in the ADC 16 is input to the controlling circuit 4'. The controlling circuit 4' performs demodulation, compensation control or the like of the input signal and outputs the resulting signal to a subsequent stage (not shown).

In transmission, the controlling circuit 4' outputs a digital signal, such as a digital modulation signal, to a digital-to-analog converting circuit (abbreviated as DAC hereinafter) 17 in the transmitting part 3'. The analog output signal of the DAC 17 produced by digital-to-analog conversion is output to an LPF 18 and to a contact d of the switch 14 via a monitoring signal line 19a.

The LPF 18 removes an unwanted frequency component, and the original modulation signal components passes through the LPF 18 and is output to a transmitting mixer 21 and to a contact c of the switch 14 via a monitoring signal line 19b.

The transmitting mixer 21 up-converts the signal input from the LPF 18, and then outputs the up-converted signal to a power amplifier (abbreviated as PA hereinafter) 22 and to a contact b of the switch 14 via a monitoring signal line 19c. The power of the signal is amplified by the PA 22, and the amplified signal is transmitted by radio from the antenna 5 as a transmission signal (TX in FIG. 9) via the switch 6.

A signal line extending from the LNA 11 to the ADC 16 in the receiving part 2' described above is a differential signal line and actually is a pair of signal lines. Similarly, a signal line extending from an output terminal of the DAC 17 to an output terminal of the PA 22 and the monitoring signal lines 19a to 19c are differential signal lines, and each signal line is actually a pair of signal lines.

The controlling circuit 4' has a parameter register 4a, for example, and supplies a parameter stored in the parameter register 4a to the DAC 17, the LPF 18 and the transmitting mixer 21 via parameter control lines 23a to 23c for compensating for a DC offset or the like.

In such an example of the conventional configuration, as a method of compensating for the DC offset of each circuit block forming the transmitting part 3', a feedback control in which parameters are configured so that the output of the ADC 16 becomes a predetermined value (0 in this case) is performed. Alternatively, a look-up table (abbreviated as LUT, not shown) control in which information in an LUT is read out from the output of the ADC 16 and a corresponding parameter is set is also possible.

However, when the DC offset of each circuit block, such as DAC 17, forming the transmitting part 3' is compensated for, the wireless transceiver 41 shown in FIG. 9 has a disadvantage described below because the output signals of the DAC 17 and the like are input to the ADC 16 via the monitoring signal lines 19a to 19c.

For example, in a case where the ADC 16 is 6-bit, the DAC 17 is 10-bit, and the input to the ADC 16 is 1 V at the maximum, and the output of the DAC 17 is also 1 V at the maximum, the resolution of the ADC 16, 1 LSB, is about 16 mV.

In this case, even if the ADC 16 has no DC offset (or a DC offset equal to or lower than 1 LSB), 1 LSB of the DAC 17 is about 1 mV, and there arises a problem that, if a few bits of DC offset occurs in the output of the DAC 17, the DC offset cannot be detected.

Thus, a wireless transceiver capable of precisely canceling or reducing the DC offset of the transmitting part 3' is required.

In this case, since the VGA 15 precedes the ADC 16, it is preferable that DC offset canceling or reduction be performed using the amplifying circuit, including the VGA 15, without using an additional circuit element.

SUMMARY OF THE INVENTION

A wireless transceiver according to an embodiment of the present invention includes: a receiving part that has an amplifying circuit that amplifies a received signal and an analog-to-digital converting circuit that converts the signal amplified by the amplifying circuit from analog to digital; a transmitting part that has a plurality of circuit blocks having different functions for transmitting a signal by wireless; a switch that performs switching among output signals of the circuit blocks forming the transmitting part for selective input thereof to the amplifying circuit; a DC offset compensating part capable of compensating for a DC offset occurring in the amplifying circuit; and a controlling circuit that performs control to cancel or reduce a DC offset occurring in each of the plurality of circuit blocks based on a digital signal output from the analog-to-digital converting circuit when the output signal of each of the plurality of circuit blocks forming the transmitting part is selectively input to the amplifying circuit.

A wireless transmission method according to another embodiment of the present invention includes: measuring a DC offset occurring in an amplifying circuit forming a receiving part that receives a signal transmitted by wireless; selectively inputting an output signal of each of a plurality of circuit blocks having different functions forming a transmitting part that transmits a signal by wireless to the amplifying circuit and inputting the signal amplified by the amplifying circuit to an analog-to-digital converting circuit; calculating a DC offset occurring in each of the plurality of circuit blocks by subtracting the DC offset occurring in the amplifying circuit from the output value of the analog-to-digital converting circuit; and performing offset compensation to cancel or reduce the DC offset occurring in each of the plurality of circuit blocks based on the result of the calculation.

DETAILED DESCRIPTION OF THE PREFERRED EMBODIMENTS

In the following, embodiments of the present invention will be described with reference to the drawings.

First Embodiment

Figure 1:
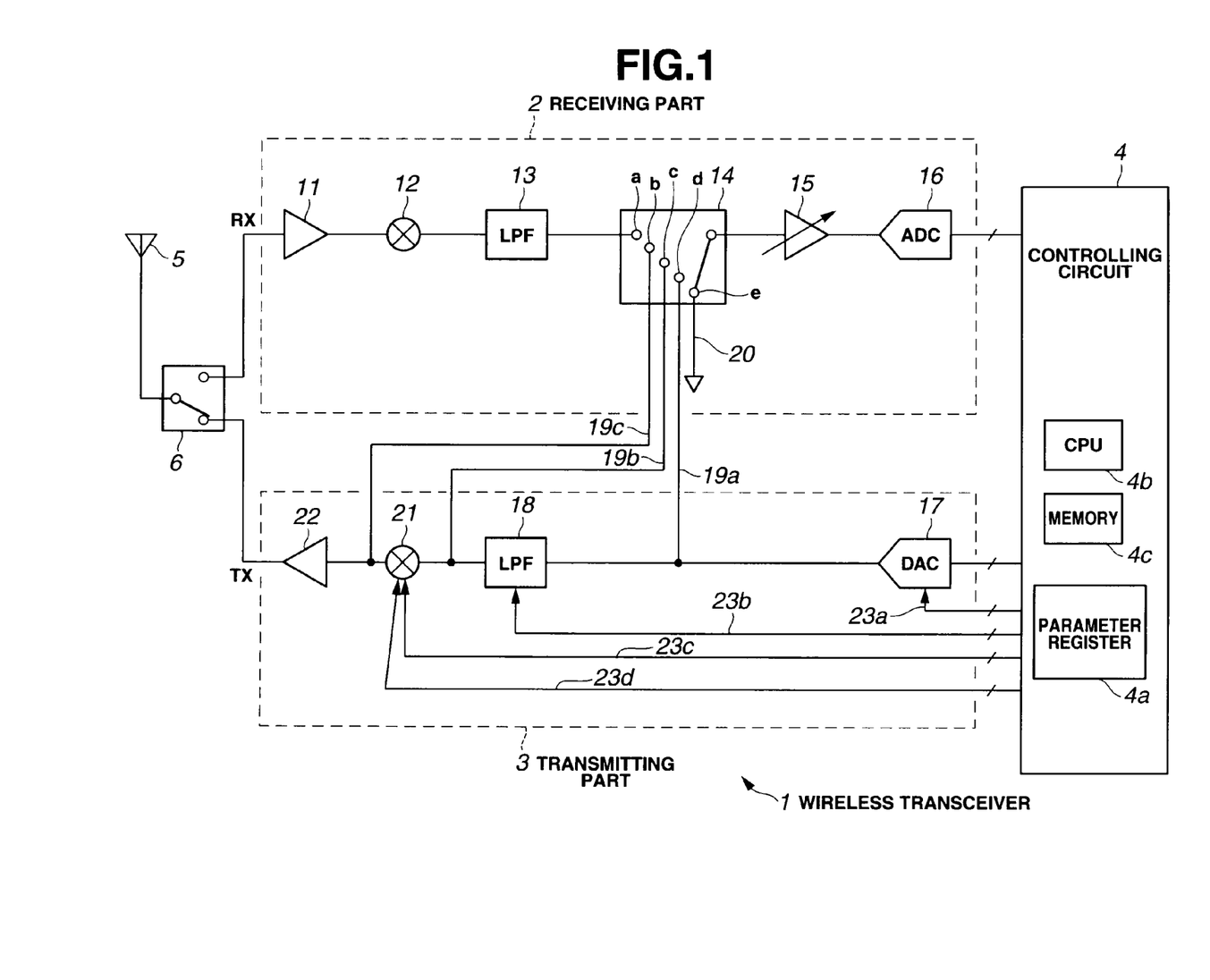
FIG. 1 is a block diagram showing a configuration of a wireless transceiver according to a first embodiment of the present invention.

FIG. 1 shows a configuration of a wireless transceiver 1 according to a first embodiment of the present invention. The wireless transceiver 1 has a configuration similar to that of the wireless transceiver 41 shown in FIG. 9.

The wireless transceiver 1 has a receiving part 2 that receives a signal transmitted by radio, a transmitting part 3 that transmits a signal by radio, and a digital controlling circuit (referred to simply as controlling circuit hereinafter) 4 that controls the receiving part 2 and the transmitting part 3.

Furthermore, the wireless transceiver 1 has an antenna 5 at which a transmission signal produced by the transmitting part 3 is externally transmitted via a radio wave and a radio wave externally transmitted is received, and a switch 6 that switchably connects the antenna 5 to the transmitting part 3 or the receiving part 2.

A signal received at the antenna 5 (RX in FIG. 1) is amplified by a low noise amplifier (abbreviated as LNA hereinafter) 11, and then input to a receiving mixer 12.

The receiving mixer 12 also receives a signal from a local oscillator (not shown) and down-converts the received signal to a signal at an intermediate frequency by mixing with the signal from the local oscillator. The signal is input from the receiving mixer 12 to a low pass filter (abbreviated as LPF hereinafter) 13, and the LPF 13 removes an unwanted frequency component, thereby extracting a signal component in a low frequency range.

The signal is input to a variable gain amplifying circuit (referred to also as variable gain amplifier and abbreviated as VGA hereinafter) 15, which is an amplifying circuit having a variable gain, via a contact a of a switch 14. Switching (selection) among contacts of the switch 14 and the gain of the VGA 15 can be controlled by the controlling circuit 4.

The signal amplified by the VGA 15 is input to an analog-to-digital converting circuit (abbreviated as ADC hereinafter) 16. As an alternative to the VGA 15, an amplifying circuit having a fixed gain (a ten-fold gain, for example) may be used in the present embodiment.

The digital signal produced by analog-to-digital conversion in the ADC 16 is input to the controlling circuit 4. The controlling circuit 4 performs demodulation, compensation control or the like of the input signal and outputs the resulting signal to a subsequent stage (not shown). The controlling circuit 4 incorporates a CPU 4b that controls the entire transceiver including the receiving part 2 and the transmitting part 3.

The CPU 4b has a function as a DC offset compensating part that compensates for a DC offset occurring in the VGA 15 described later and a function of compensating for a DC offset of the receiving part 2. In addition, the CPU 4b performs a control operation for measuring a DC offset occurring in each of a plurality of circuit blocks having different functions forming the transmitting part 3, a control operation for minimizing or canceling the DC offset, or the like.

In transmission, the controlling circuit 4 outputs a digital modulation signal to a digital-to-analog converting circuit (abbreviated as DAC hereinafter) 17 in the transmitting part 3. The analog output signal of the DAC 17 produced by digital-to-analog conversion is output to an LPF 18 and to a contact d of the switch 14 via a monitoring signal line 19a.

The LPF 18 removes an unwanted frequency component, and the original modulation signal component to be transmitted passes through the LPF 18 and is output to a transmitting mixer 21 and to a contact c of the switch 14 via a monitoring signal line 19b.

The transmitting mixer 21 up-converts the signal input from the LPF 18 into a carrier and outputs the carrier to a power amplifier (abbreviated as PA hereinafter) 22 and to a contact b of the switch 14 via a monitoring signal line 19c. The power of the signal is amplified by the PA 22, and the amplified signal is transmitted by radio from the antenna 5 as a transmission signal (TX in FIG. 1) via the switch 6.

In the present embodiment, the switch 14 has a contact e, which is grounded via a signal line 20.

A signal line extending from the LNA 11 to the ADC 16 in the receiving part 2 described above is a differential signal line and actually is a pair of signal lines.

Similarly, a signal line extending from an output terminal of the DAC 17 to an output terminal of the PA 22 in the transmitting part 3 and the monitoring signal lines 19a to 19c are differential signal lines, and each signal line is actually a pair of signal lines. The same holds true for the signal line 20.

The controlling circuit 4 has a parameter register 4a, for example, and supplies a parameter stored in the parameter register 4a to the DAC 17, the LPF 18 and the transmitting mixer 21 via parameter control lines 23a to 23c to enable adjustment for reducing or, more specifically, minimizing the DC offset.

With the configuration according to the present embodiment, DC offsets of the receiving part 2 and the transmitting part 3 can be compensated for as described below. First, an operation of compensating for a DC offset of the receiving part 2 will be described with reference to FIG. 2.

Figure 2:
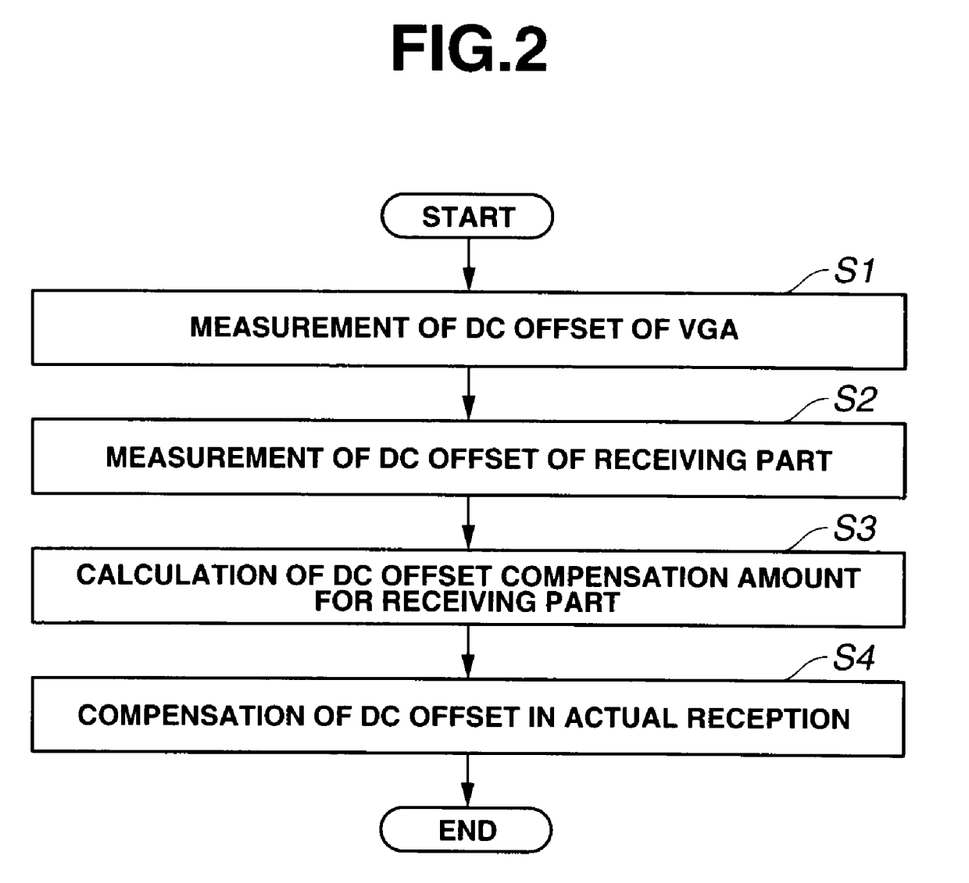
FIG. 2 is a flowchart showing a processing of compensating for a DC offset of a receiving part of the wireless transceiver according to the first embodiment.

FIG. 2 is a flowchart showing an example of a procedure of compensating for a DC offset of the receiving part 2. To perform a DC offset compensation, the DC offset compensation amount to perform the DC offset compensation has to be calculated. Steps S1 to S3 in the procedure described below are a process of calculating the DC offset compensation amount.

When the wireless transceiver 1 is powered on and activated, the CPU 4b in the controlling circuit 4 performs a processing of measuring (detecting) a DC offset of the VGA 15 as shown in step S1.

In this case, the CPU 4b makes the switch 14 connect a common contact to the contact e (the state shown in FIG. 1). In this state, a zero signal is applied to an input terminal of the VGA 15.

Therefore, the value of the DC offset of the VGA 15 can be detected by measuring (detecting) the output level of the VGA 15 in this state.

Then, the CPU 4b performs setting of a gain of the VGA 15 (by applying a gain control signal (not shown) to the VGA 15, for example), fetches from the ADC 16 a digital value produced by analog-to-digital conversion in the ADC 16 for the set gain, and detects the digital value as the DC offset value. Then, the value is stored in a memory 4c, for example, in the controlling circuit 4. Then, the controlling circuit 4 can compensate for the DC offset in that case according to the actually used gain.

An offset occurs also in the ADC 16. However, the effect of the offset can be small enough if the offset value is equal to or lower than 1 LSB, which is the resolution of the ADC 16.

Following the processing of measuring the DC offset of the VGA 15 in step S1, the CPU 4b performs a processing of measuring a DC offset of the receiving part 2 in step S2.

In this case, the CPU 4b makes the switch 14 connect the common contact to the contact a. In addition, the CPU 4b prevents a signal from being input to an input terminal of the LNA 11.

Then, in this state, the CPU 4b modifies the setting of the gain of the VGA 15 and measures a digital value output from the ADC 16 in this state.

Then, in the following step S3, the CPU 4b performs calculation of the DC offset compensation amount for the receiving part 2.

That is, the CPU 4b stores the digital value measured in step S2 in the memory 4c as the DC offset value of the receiving part 2. The DC offset value is the DC offset value of the receiving part 2 including the DC offset value of the VGA 15.

In this way, calculation of data required for performing the DC offset compensation is completed.

Then, when a signal is actually received, the DC offset compensation can be performed by subtracting the DC offset value stored in the memory 4c from the digital value input to the controlling circuit 4 as shown in step S4.

Alternatively, as with the operation of the transmitting part 3 shown in FIG. 3 described below, the DC offset value of each circuit block in the receiving part 2 may be adjusted to be minimum using a parameter.

Next, with reference to FIG. 3, an operation of compensating for (or reducing) a DC offset of each circuit block in the transmitting part 3 will be described. FIG. 3 is a flowchart showing an example of a procedure of compensating for a DC offset of the transmitting part 3. To perform a DC offset compensation, the DC offset measurement to perform the DC offset compensation has to be performed.

In the present embodiment, the wireless transceiver 1 has a function of setting the DC offset value of each circuit block (each of a plurality of circuit blocks) in the transmitting part 3 at a minimum value.

The CPU 4b in the controlling circuit 4 performs a processing of measuring (detecting) the DC offset of the VGA 15 as shown in step S11. This processing is the same as the processing in step S1 shown in FIG. 2 and thus can be omitted in the case where the procedure is performed following the procedure shown in FIG. 2. The DC offset measurement needs to be performed only for the gain set in the following step S12.

The CPU 4b performs setting of the gain of the VGA 15 in the following step S12 and performs measurement of the DC offset of each of a plurality of circuit blocks (having different functions) in the transmitting part 3 in the following step S13. In measurement of the DC offsets, as described later, setting for DC offset minimization or DC offset canceling for each circuit blocks is performed using a parameter.

In setting of the gain of the VGA 15 in step S112, the gain is set within a range from a 10-fold gain (20 dB) to a 100-fold gain (40 dB), for example. Then, measurement in step S13 is performed. If the gain of the VGA 15 is set at a high value in this way, the value of the DC offset can be measured even if the DC offset is a low DC offset, specifically, a DC offset equal to or lower than the resolution of the ADC 16.

For example, when measurement of the DC offset of the DAC 17 is performed, the CPU 4b makes the switch 14 select the contact d. Then, under the control of the CPU 4b, a zero digital value is applied to an input terminal of the DAC 17, and a digital value Da of the ADC 16 at this time is measured.

An offset occurs also in the ADC 16. However, the effect of the offset can be small enough if the offset value is equal to or lower than 1 LSB, which is the resolution of the ADC 16.

Since the DC offset value of the VGA 15 is known as a result of the processing in step S11 (the DC offset value is denoted by Ov), a DC offset value Od of the DAC 17 can be calculated by subtracting the DC offset value Ov from the digital value Da and dividing the difference by the gain of the VGA 15.

In this case, the CPU 4b modifies or adjusts the value of a DAC parameter from the parameter register 4a so that the DC offset value Od is minimized. As a result, the DC offset value Od of the DAC 17 can be sufficiently reduced (to a value close to that in the case where the DC offset is cancelled). That is, the DC offset of the DAC 17 is minimized or canceled by using a parameter.

Then, the CPU 4b sets the DAC parameter that provides the minimum offset value Od in the parameter register 4a and uses the DAC parameter in the subsequent process. In addition, the CPU 4b stores the calculated offset value Od of the DAC 17 in the memory 4c.

The same operation is performed for the other circuit blocks. For example, when measurement of the DC offset of the LPF 18 is performed, the CPU 4b makes the switch 14 select the contact c. Then, under the control of the CPU 4b, a zero digital value is applied to the input terminal of the DAC 17, and a digital value Dl of the ADC 16 at this time is measured.

Since the DC offset value Ov of the VGA 15 is known, and the DC offset value Od of the DAC 17 is known, a DC offset value Ol of the LPF 18 can be calculated by subtracting the DC offset values Ov and Od from the digital value Dl and dividing the difference by the gain of the VGA 15.

In this case also, the CPU 4b modifies or adjusts the value of an LPF parameter from the parameter register 4a so that the DC offset value Ol is minimized. Then, the CPU 4b sets the LPF parameter that provides the minimum offset value Ol in the parameter register 4a and uses the LPF parameter in the subsequent process.

In this case also, the DC offset value Ol of the LPF 18 can be sufficiently reduced (to a value close to that in the case where the DC offset is cancelled). In addition, the CPU 4b stores the calculated offset value Ol of the LPF 18 in the memory 4c.

When reduction of the DC offset of the LPF 18 is performed, the control can be performed so that the digital value Dl is minimized.

When measurement of the DC offset of the transmitting mixer 21 is performed, the CPU 4b makes the switch 14 select the contact b. Then, under the control of the CPU 4b, a zero digital value is applied to the input terminal of the DAC 17, and a digital value Dm of the ADC 16 at this time is measured. In this step, in order to prevent up-conversion by the transmitting mixer, an LO signal input to a local oscillator terminal (LO terminal) of the transmitting mixer connected to the local oscillator has to be controlled to be fixed at the ON or OFF state.

For example, the CPU 4b performs the control by transmitting a control signal via a control line 23d to prevent the LO signal from being input to the LO terminal of the transmitting mixer 21.

Since the DC offset value Ov of the VGA 15, the DC offset value Od of the DAC 17, and the DC offset value Ol of the LPF 18 are known, a DC offset value Om of the transmitting mixer 21 can be calculated by subtracting the DC offset values Ov, Od and Ol from the digital value Dm and dividing the difference by the gain of the VGA 15.

Then, the CPU 4b modifies or adjusts the value of a transmitting mixer parameter and sets a transmitting mixer parameter that provides a minimum DC offset value Om in the parameter register 4a. Thus, the DC offset value Om of the transmitting mixer 21 can be sufficiently reduced. In the subsequent process, the CPU 4b uses the transmitting mixer parameter.

In addition, the CPU 4b stores the DC offset value Om of the transmitting mixer 21 in the memory 4c.

When reduction of the DC offset of the transmitting mixer 21 is performed, the control can be performed so that the digital value Dm is minimized.

In addition, the CPU 4b stores the digital value Dm in the memory 4c as the DC offset value of the transmitting part 3, that is, a DC offset compensation amount Hs.

That is, the DC offset compensation amount Hs of the transmitting part 3 is calculated in step S14.

In this way, the DC offsets of the circuit blocks in the transmitting part 3 are measured, the DC offsets are minimized or cancelled using the respective parameters, and a measurement processing required to compensate for a DC offset that cannot be cancelled by the DC offset minimization using the parameters is completed. Then, the DC offset compensation amount for the transmitting part 3 is calculated.

As a result of the minimization of the DC offsets described above, the parameters are set so that the DC offset values Od, Ol and Om of the DAC 17, the LPF 18 and the transmitting mixer 21 as circuit blocks forming the transmitting part 3, respectively, are minimized. The parameters allow most of the DC offsets of the circuit blocks to be set at a small value close to zero.

Furthermore, in the present embodiment, in transmission, a DC offset that cannot be cancelled by adjusting the setting of the parameters to minimize the DC offset is compensated for by outputting the original digital modulation signal to the DAC 17 by subtracting the DC offset compensation amount Hs from the original digital modulation signal, for example (step S15).

After that, when the transmitting part 3 actually transmits a transmission signal as shown in step S15, the CPU 4b configures the circuit blocks to operate with their respective minimum offsets using the parameters described above. In addition, the transmission is performed by compensating for any DC offset of the transmitting part 3 existing in this state.

Figure 3:
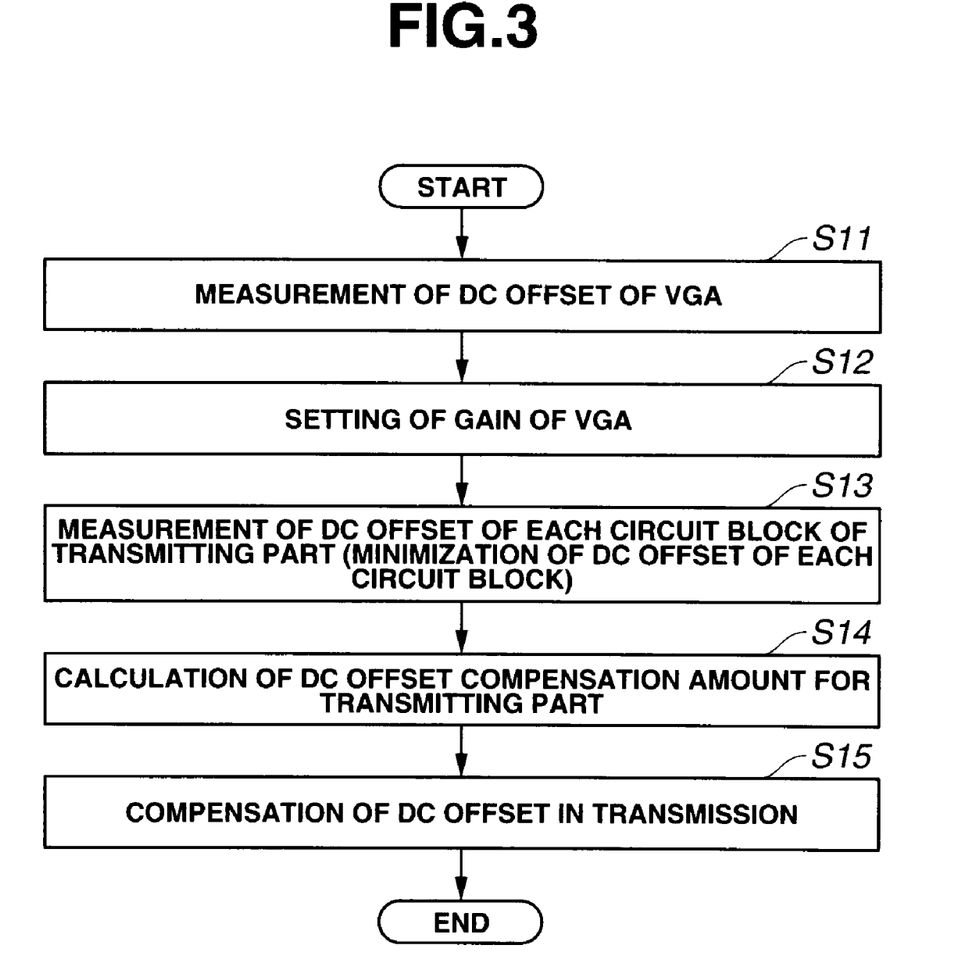
FIG. 3 is a flowchart showing a processing of compensating for a DC offset of a transmitting part of the wireless transceiver according to the first embodiment.

By the way, step S11 can be exchanged with step S12 in FIG. 3.

As described above, according to the first embodiment, the output signal of each of the plurality of circuit blocks in the transmitting part 3 can be amplified by the VGA 15 via the switch 14, and then input to the ADC 16, thereby enabling measurement of the DC offset.

Thus, the disadvantage of the prior art that the DC offset of each circuit block in the transmitting part 3 cannot be measured if the DC offset is low is overcome, and even a low DC offset can be measured.

Furthermore, according to the present embodiment, the DC offset values of the plurality of circuit blocks in the transmitting part 3 are calculated separately, and the parameters are set so that the DC offset values of the plurality of circuit blocks are minimized (that is, canceled). Thus, the DC offset of the transmitting part 3 can be reduced sufficiently (compared with the case where the DC offset of one functional circuit block is performed), and the DC offset can be cancelled or reduced with high precision.

In addition, a residual DC offset of the transmitting part 3 that cannot be cancelled by the DC offset minimization based on parameter setting is compensated for by a compensation amount of the reverse polarity. As a result, according to the present embodiment, not only the DC offset of the receiving part 2 but also the DC offset of the transmitting part 3 can be canceled or reduced with high precision.

Furthermore, according to the present embodiment, the DC offsets of the plurality of circuit blocks having different functions in the transmitting part 3 can be measured using the VGA 15 and the ADC 16 in the receiving part 2, and therefore, an additional VGA 15 or the like is not needed.

As with the transmitting part 3 described above, parameters for the circuit blocks in the receiving part 2 can also be set so that the DC offsets thereof are minimized, for example. In that case, the DC offset of the receiving part 2 can be reduced further.

As an alternative to the method of minimizing the DC offsets of the circuit blocks including the DAC 17, the LPF 18 and the transmitting mixer 21 by setting the respective parameters, the control can be performed as described below. For example, in the case where a circuit block is composed of a plurality of circuit elements having different characteristics or the like that are switchably used, the DC offset of the circuit block can be minimized by performing switching among the circuit elements.

Second Embodiment

Figure 10:
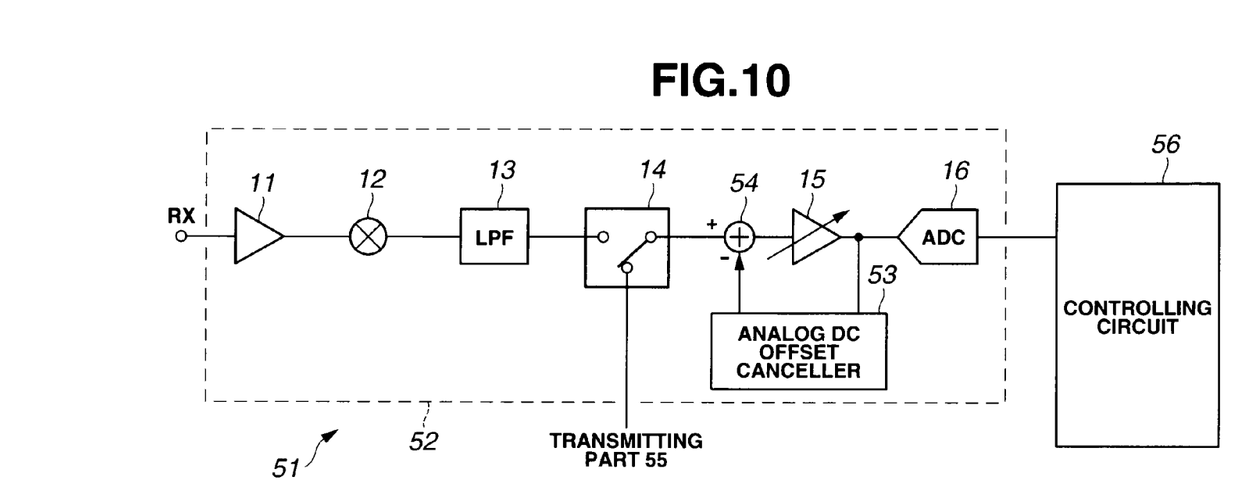
FIG. 10 is a block diagram showing a configuration of a part of a wireless transceiver according to a first reference example.

Prior to describing a second embodiment of the present invention, reference examples relating to the second embodiment will be first described. FIG. 10 shows a part of a wireless transceiver 51 according to a first reference example relating to the second embodiment.

The wireless transceiver 51 is similar to the wireless transceiver 1 shown in FIG. 1, and a receiving part 52 has a switch 14 between an LPF 13 and a VGA 15.

The receiving part 52 has an analog DC offset canceling circuit 53, and the analog DC offset canceling circuit 53 constantly cancels an offset of the VGA 15.

That is, the analog DC offset canceling circuit 53 fetches the output signal of the VGA 15 and applies (returns) the output signal to an adder (subtracter) 54 disposed at an input terminal of the VGA 15 to subtract the output signal from the input signal, thereby constantly canceling the offset of the input signal.

Therefore, the wireless transceiver 51 that constantly cancels the offset cannot be used to measure the DC offset by inputting the output of a transmitting part 55 to the VGA 15 via the switch 14.

The output signal of the ADC 16 is input to a controlling circuit 56.

Figure 11:
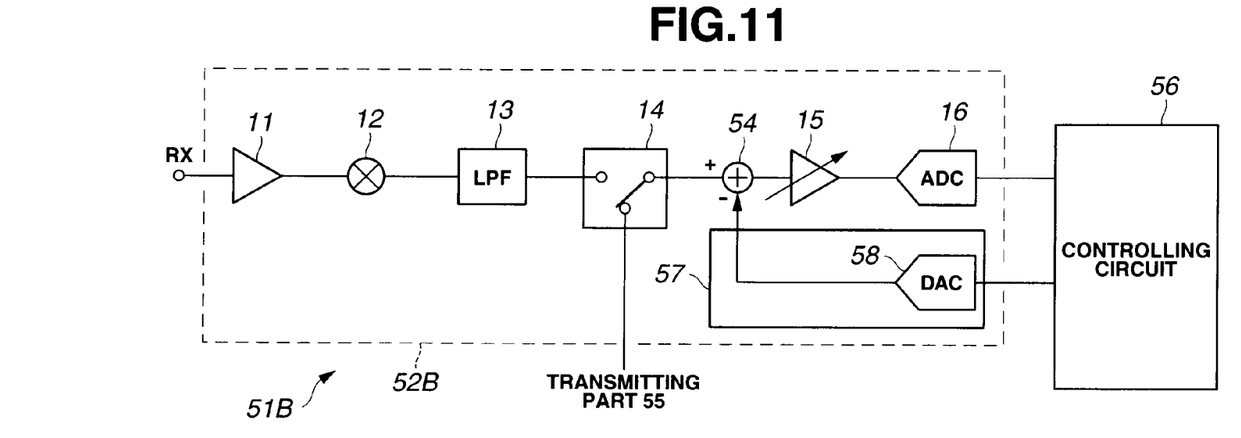
FIG. 11 is a block diagram showing a configuration of a part of a wireless transceiver according to a second reference example.

FIG. 11 shows a part of a wireless transceiver 51B according to a second reference example relating to the second embodiment.

The wireless transceiver 51B has a DAC 58, which constitutes a digital DC offset canceling circuit 57, instead of the analog DC offset canceling circuit 53 in the receiving part 52 in FIG. 10.

That is, in FIG. 11, a controlling circuit 56 applies a digital set value to an adder 54 via the DAC 58. The digital set value is a value for canceling a DC offset of the entire receiving part 52. Therefore, the wireless transceiver 51B of the reference example 2 also has not been used for canceling a DC offset of a transmitting part 55.

Figure 4:
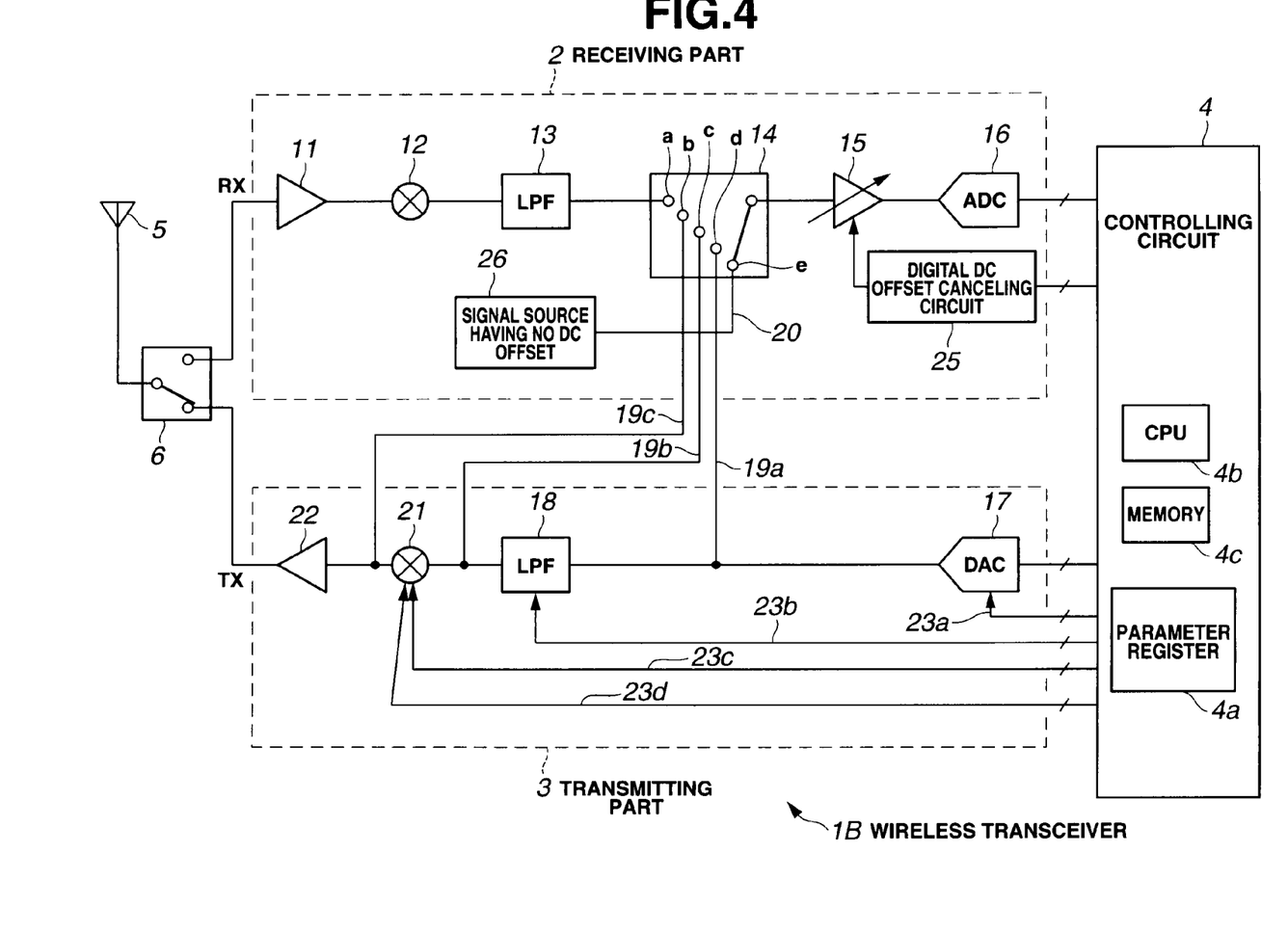
FIG. 4 is a block diagram showing a configuration of a wireless transceiver according to a second embodiment of the present invention.

A wireless transceiver 1B according to the second embodiment shown in FIG. 4 is intended to overcome the disadvantage.

The wireless transceiver 1B shown in FIG. 4 has a configuration similar to that of the wireless transceiver 1 shown in FIG. 1. More specifically, the wireless transceiver 1B differs from the wireless transceiver 1 shown in FIG. 1 in that a digital DC offset canceling circuit 25 is provided as means of compensating for a DC offset of a VGA 15.

In addition, while the contact e of the switch 14 is grounded via the signal line 20 in the wireless transceiver 1 shown in FIG. 1, a contact e of a switch 14 of the wireless transceiver 1B shown in FIG. 4 is connected to a signal source 26 having no DC offset. Alternatively, the contact e of the switch 14 of the wireless transceiver 1 shown in FIG. 1 may be connected to the signal source 26 having no DC offset.

A CPU 4b in a controlling circuit 4 performs measurement of a DC offset value of the VGA 15 in the same manner as described in the first embodiment. Then, according to the present embodiment, a DC offset compensation value is applied to the VGA 15 via the digital DC offset canceling circuit 25 to cancel the DC offset value of the VGA 15.

As a result, the VGA 15 maintains (keeps) the state where the DC offset value is cancelled.

Then, in the state where the DC offset of the VGA 15 is cancelled, a DC offset value of a receiving part 2 due to an LNA 11, a receiving mixer 12 and an LPF 13 in the receiving part 2 is measured.

After the measurement, a receiving-part DC offset compensation value to cancel a DC offset value of the receiving part 2 is applied to the VGA 15 via the digital DC offset canceling circuit 25.

In this case, the DC offset compensation value is applied to the VGA 15 so that the DC offset value of the VGA 15 is also cancelled at the same time. In this way, the DC offset of the input signal to an ADC 16 is reduced to a level equal to or lower than the resolution of the ADC 16, which is substantially a zero DC offset.

As a result, the DC offset occurring in the receiving part 2 is cancelled, and in this state, the receiving part 2 performs actual signal reception.

In this state, a predetermined input range or dynamic range of the ADC 16 is prevented from being narrowed down due to canceling of the DC offset of the receiving part 2.

That is, in the first embodiment, for example, although the DC offset of the VGA 15 can be compensated for by the CPU 4b in the controlling circuit 4 after the signal passes through the ADC 16, the input range of the ADC 16 is narrowed down due to canceling of the DC offset of the VGA 15.

However, according to the present embodiment, the effect of the DC offset or the like of the VGA 15 is canceled and the state is maintained before the signal is input to the ADC 16, the problem that the input range of the ADC 16 is narrowed down is solved.

In addition, according to the present embodiment, measurement of the DC offset of the transmitting part 3 is also performed in the state where the DC offset of the VGA 15 is cancelled. In this case also, the value of the DC offset occurring in each circuit block in the transmitting part 3 can be easily measured. In addition, the value of the DC offset occurring in each circuit block in the transmitting part 3 can be more precisely calculated. In addition, the DC offset can be more precisely canceled or reduced.

That is, in the first embodiment, the input range of the ADC can be narrowed down because of canceling of the DC offset of the VGA 15. Therefore, if the level of the output signal of the circuit block to be measured is set at a value close to the limit of the input range of the ADC 16, the limit of the input range of the ADC 16 can be reached, and saturation can occur, as a result of canceling of the DC offset of the VGA 15. Thus, the effect of canceling of the DC offset of the VGA 15 has to be taken into consideration when the gain of the VGA 15 is close to the limit of the input range.

To the contrary, according to the present embodiment, when the gain of the VGA 15 is changed, the state where the DC offset occurring in the VGA 15 for the changed gain is canceled is maintained.

Therefore, the input range of the ADC 16 is not narrowed down from the original input range but is kept constant. Therefore, the gain of the VGA 15 can be set sufficiently high, and the DC offset thereof can be measured, under the condition that the DC offset value of the circuit block falls within the input range of the ADC 16. Therefore, the DC offset value can be calculated more simply and more precisely. In other respects, the second embodiment has the same effects as the first embodiment.

Figure 5:
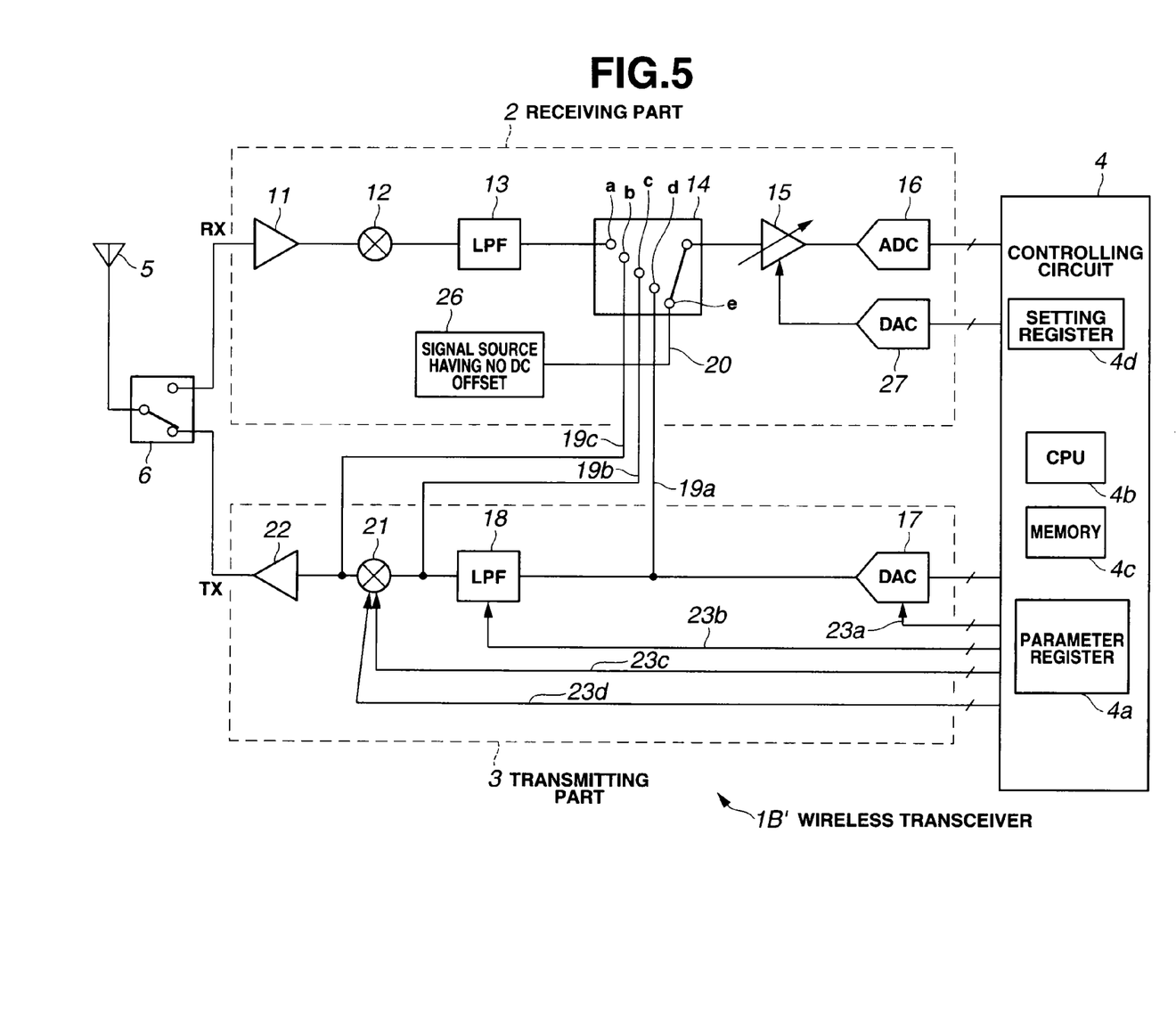
FIG. 5 is a block diagram showing a configuration of a wireless transceiver according to a modification of the second embodiment.

As a modification of the configuration shown in FIG. 4, the configuration shown in FIG. 5 is possible. FIG. 5 shows a configuration of a wireless transceiver 1B' according to a modification of the second embodiment of the present invention.

In the wireless transceiver 1B', the digital DC offset canceling circuit 25 shown in FIG. 4 is replaced with a DAC 27. A controlling circuit 4 makes the setting register 4d output a digital value for DC offset canceling to the DAC 27.

When the receiving part 2 receives a signal, the CPU 4b in the controlling circuit 4 makes the setting register 4d output a digital value to cancel the DC offset of the receiving part 2 to the DAC 27.

On the other hand, when the DC offset of each circuit block in the transmitting part 3 is measured, the setting register 4d outputs a digital value to cancel the DC offset value of the VGA 15.

Alternatively, the setting register 4d and the parameter register 4a may be constituted by one common register (the common register will be referred to simply as register hereinafter), and the register may be used in a time sharing manner so that different digital values are set in the register for reception and transmission.

Specifically, the register may output a digital value to cancel the DC offset of the receiving part 2 to the DAC 27 when signal reception is performed and output a digital value (a parameter value) to set the DC offset at the minimum value to each circuit block in the transmitting part 3 when signal transmission is performed.

Furthermore, a compensation value to cancel a residual DC offset of the transmitting part 3 (a DC offset that cannot be cancelled by parameter setting) may be output to the input terminal of the DAC 17. The present modification has substantially the same effects as the second embodiment.

Third Embodiment

Figure 6:
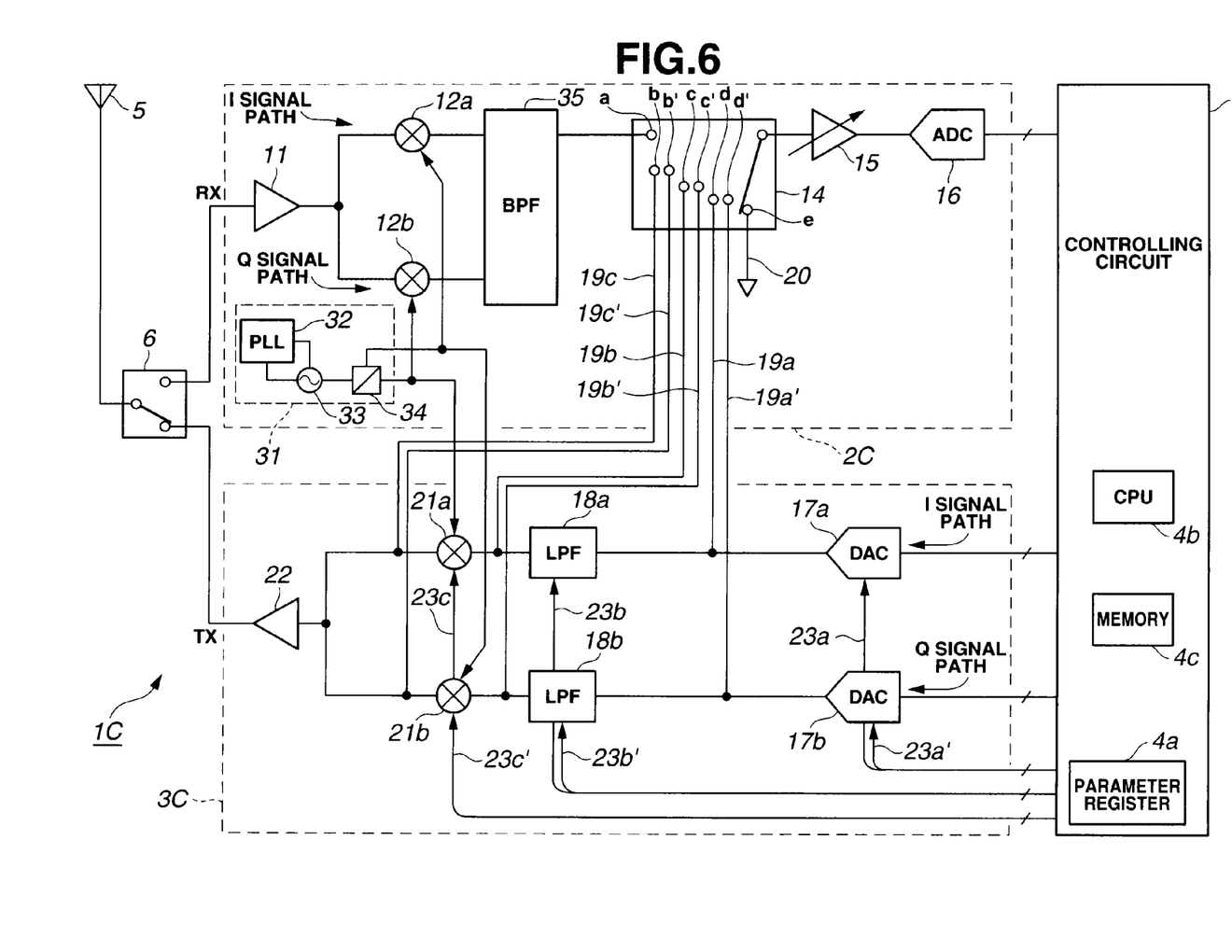
FIG. 6 is a block diagram showing a configuration of a wireless transceiver according to a third embodiment of the present invention.

Next, with reference to FIG. 6, a third embodiment of the present invention will be described. FIG. 6 shows a configuration of a wireless transceiver 1C according to the third embodiment.

In addition to compensation of the DC offset in the first embodiment, for example, the configuration according to the present embodiment performs compensation of a mismatch between two signals in an orthogonal phase relationship, that is, an I signal (a signal in phase with a base signal) and a Q signal (an orthogonal signal component out of phase with the I signal by 90 degrees).

The wireless transceiver 1C has a receiving part 2C instead of the receiving part 2 of the wireless transceiver 1 shown in FIG. 1 and a transmitting part 3C instead of the transmitting part 3 of the wireless transceiver 1 shown in FIG. 1.

A received signal is amplified by an LNA 11 in the receiving part 2C, and the amplified signal is input to receiving quadrature mixers 12a and 12b, which form an I signal path for producing an I signal and a Q signal path for producing a Q signal, respectively.

The receiving quadrature mixers 12a and 12b convert the amplified received signal into signals at an intermediate frequency containing the I signal, which is an in-phase component, and the Q signal, which is an orthogonal component, respectively, using oscillation signals in an orthogonal phase relationship from an oscillator 31.

The oscillator 31 has a phase locked loop (PLL) circuit 32, a voltage-controlled oscillator (VCO) 33 that oscillates in a predetermined phase under the control of the PLL circuit 32, and a divide-by-2 frequency divider 34 that divides the frequency of the output of the VCO 33 in half to produce oscillation signals in an orthogonal phase relationship.

The signals containing the I signal and the Q signal produced by the receiving quadrature mixers 12a and 12b are input to a complex band pass filter 35, and an image rejection of the signals is reduced by the complex band pass filter 35, and then, the signals are input to a contact a of the switch 14.

A common contact of the switch 14 is connected to an input terminal of a VGA 15. The signals are amplified by the VGA 15, and the amplified signals are input to a controlling circuit 4 via an ADC 16. Then, a demodulation processing is performed in the controlling circuit 4.

In transmission, the controlling circuit 4 outputs a digital I signal and a digital Q signal to DACs 17a and 17b on an I signal path and a Q signal path, which are transmission paths for the digital I signal and the digital Q signal, respectively. An analog I signal and an analog Q signal output from the DACs 17a and 17b are input to transmitting quadrature mixers (or quadrature modulators) 21a and 21b via LPFs 18a and 18b, respectively.

The transmitting quadrature mixers 21a and 21b perform quadrature modulation of the received signals and up-converts the signals into a carrier using the oscillation signals in an orthogonal phase relationship from the oscillator 31.

The up-converted signals are added together, the sum signal is input to a PA 22 and amplified in power by the PA 22, and the amplified signal is transmitted as a transmission signal from an antenna 5 via a switch 6.

The analog I signal and the analog Q signal output from the DACs 17a and 17b are applied to contacts d and d' of the switch 14 via monitoring signal lines 19a and 19a', respectively.

The output signals of the LPFs 18a and 18b are applied to contacts c and c' of the switch 14 via monitoring signal lines 19b and 19b', respectively. The output signals of the transmitting quadrature mixers 21a and 21b are applied to contacts b and b' of the switch 14 via monitoring signal lines 19c and 19c', respectively. As in the first embodiment, a contact e of the switch 14 is grounded.

The controlling circuit 4 has a parameter register 4a, for example, and can supply parameters stored in the parameter register 4*a* to the DACs 17*a* and 17*b*, the LPFs 18*a* and 18*b* and the transmitting quadrature mixers 21*a* and 21*b* via parameter controlling lines 23*a*, 23*a'*, 23*b*, 23*b'*, 23*c* and 23*c'* to adjust the DC offsets thereof or the like.

Furthermore, according to the present embodiment, when the compensation of the DC offset of the receiving part 2C and the measurement for the compensation to cancel the mismatch between the I signal and the Q signal are performed, the input terminals of the receiving quadrature mixers 12*a* and 12*b* can be separated (not shown).

Furthermore, according to the present embodiment, when the compensation of the DC offset of the transmitting part 3C and the measurement for the compensation to cancel the mismatch between the I signal and the Q signal are performed, the output terminals of the transmitting quadrature mixers 21*a* and 21*b* can be separated (not shown). The remainder of the configuration is the same as the configuration described above with reference to FIG. 1.

The operation of the wireless transceiver 1C thus configured to compensate for the DC offset of the receiving part 2C is similar to the process described in the first embodiment with reference to FIG. 2.

Figure 7:
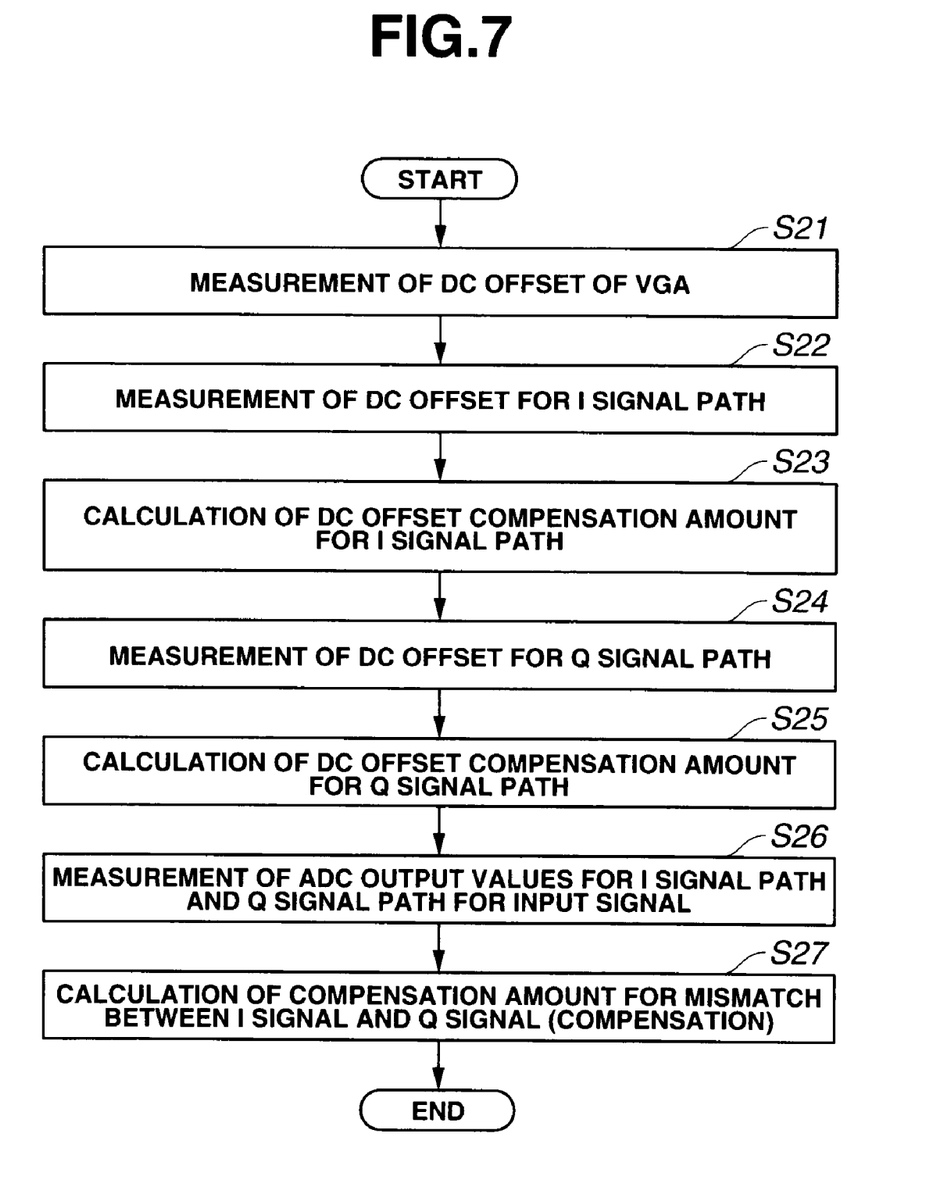
FIG. 7 is a flowchart showing a processing of compensating for a DC offset of a receiving part and a mismatch between an I signal and a Q signal according to the third embodiment of the present invention.

FIG. 7 is a flowchart for illustrating a case where a mismatch between the I signal and the Q signal is compensated for after a DC offset of the receiving part 2C is compensated for according to the present embodiment.

The first step S21 is the same as step S1 shown in FIG. 2. Steps S22, S23, S24 and S25 shown in FIG. 7 are the same as the processings in steps S2 and S3 shown in FIG. 2 performed for the I signal path and the Q signal path.

For example, in processings concerning the DC offset of the I signal in steps S22 and S23, measurement of the output value of the ADC 16 or the like is performed with an input terminal of the receiving quadrature mixer 12*a* grounded. In processings concerning the DC offset of the Q signal in steps S24 and S25, the same processing is performed with an input terminal of the receiving quadrature mixer 12*b* grounded.

In this way, DC offset compensation amounts for the I signal path and the Q signal path in the receiving part 2C are calculated, and the DC offset compensation can be performed.

Furthermore, to compensate for the mismatch between the I signal and the Q signal in the receiving part 2C, as shown in step S26, the CPU 4*b* inputs known input signals having the same amplitude to the input terminals of the receiving quadrature mixers 12*a* and 12*b* and measures the output values of the ADC 16 for the I signal path and the Q signal path.

The difference between the output values in this case (in the case where the DC offset of the VGA 15 or the like is already compensated for) is the mismatch between the I signal and the Q signal for the input signals (in other words, the output values of the ADC 16).

In this way, the amount of mismatch between the I signal and the Q signal for the amplitude of the input signals (in other words, the output values of the ADC 16) can be calculated.

Therefore, as shown in step S27, the mismatch between the I signal and the Q signal can be compensated for so that the difference therebetween becomes zero by adding or subtracting the compensation amount for the mismatch between the I signal and the Q signal, or the difference therebetween, for example, to or from one of the values to make the value agree with the other value.

Figure 8:
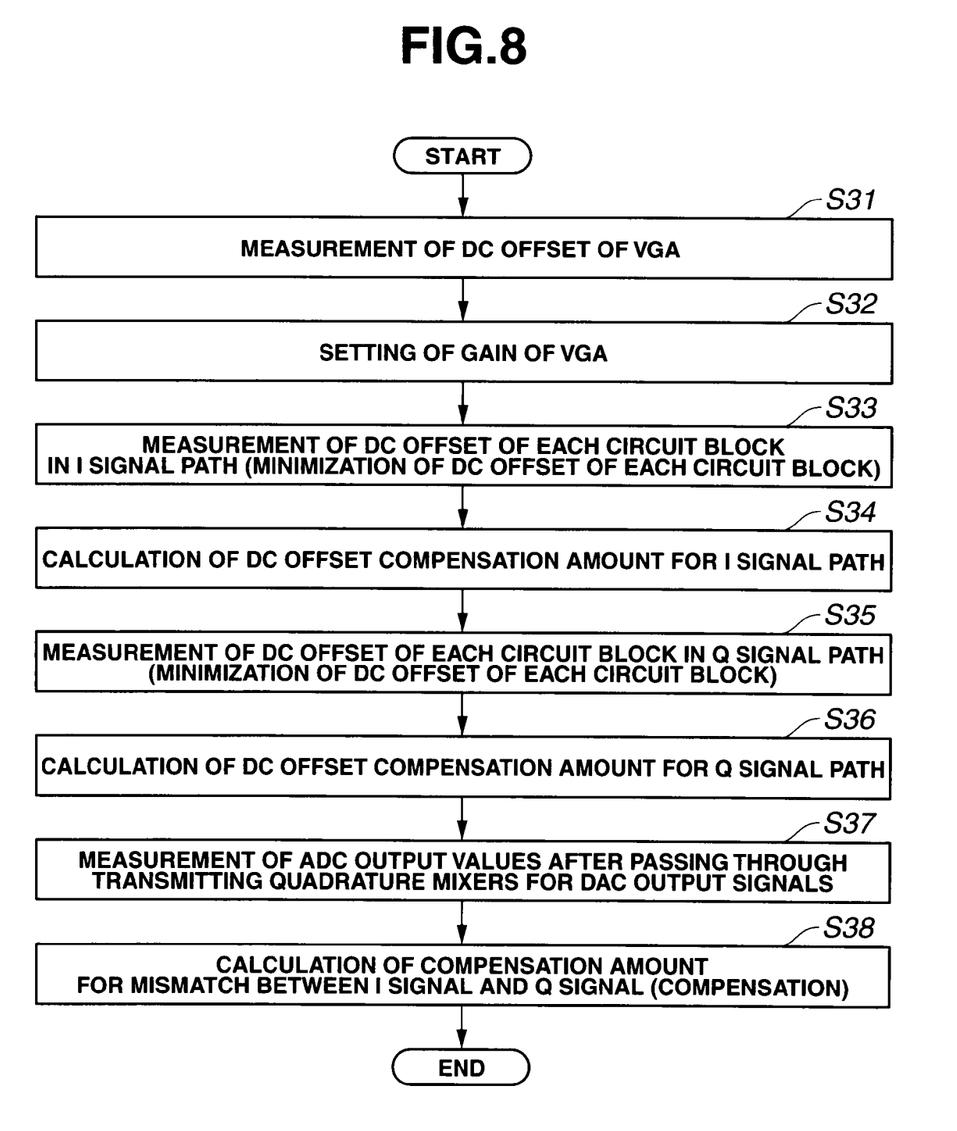
FIG. 8 is a flowchart showing a processing of compensating for a DC offset of a transmitting part and a mismatch between an I signal and a Q signal according to the third embodiment of the present invention.

FIG. 8 is a flowchart for illustrating a case where a mismatch between the I signal and the Q signal is compensated for after a DC offset of the transmitting part 3C is compensated for. The processings for DC offset compensation in steps S31 to S36 in this case are similar to the processings shown in FIG. 3.

The first steps S31 and S32 are the same as steps S11 and S12 shown in FIG. 3.

Steps S33, S34, S35 and S36 shown in FIG. 8 are the same as the processings in steps S13 and S14 shown in FIG. 3 performed for the I signal path and the Q signal path.

For example, in processings concerning the DC offset of the I signal in steps S33 and S34, the same processings as those in steps S13 and S14 shown in FIG. 3, such as DC offset measurement, is performed by successively selecting contacts d, c and b of the switch 14. In processings concerning the DC offset of the Q signal in steps S35 and S36, the same processings are performed by successively selecting contacts d', c' and b'. As described above with reference to FIG. 3, in DC offset measurement, minimization (canceling) of the DC offset of each circuit block is also performed.

In this way, the DC offset of each circuit block in the I signal path and the Q signal path of the transmitting part 3C is approximately canceled, and the still remaining DC offsets for the I signal path and the Q signal path are calculated as DC offset compensation amounts.

Then, the DC offsets for the I signal path and the Q signal path in the transmitting part 3C can be compensated for using the DC offset compensation amounts, thereby precisely performing compensation (or canceling) of the DC offset of the transmitting part 3C.

As shown in step S37, to compensate for the mismatch between the I signal and the Q signal in the transmitting part 3C, the CPU 4*b* measures the output values of the ADC 16 after passing through the transmitting quadrature mixers 21*a* and 21*b* for the output signals having the same amplitude of the DACs 17*a* and 17*b* (or the same input signal to the DACs 17*a* and 17*b*).

The difference between the output values of the ADC (the output values after compensation of the DC offset of the VGA 15 and compensation of the DC offsets for the I signal path and the Q signal offset in the transmitting part 3C are performed) in this case divided by the gain of the VGA 15 is the amount of mismatch between the I signal and the Q signal for the DAC input signals.

Then, in step S38, the compensation amount for the mismatch between the I signal and the Q signal for correcting one or both of the transmitting quadrature mixers 21*a* and 21*b* so that the ADC output values agree with each other can be calculated.

By the way, step S31 can be exchanged with step S32 in FIG. 8.

The mismatch compensation amount can be calculated by examining the modulation characteristics of the transmitting quadrature mixers 21*a* and 21*b* by changing the amplitude of the input signals to the DACs 17*a* and 17*b*, for example.

Furthermore, in order that the mismatch compensation amount is minimized, the CPU 4*b* in the controlling circuit 4 can correct the modulation characteristics of the transmitting quadrature mixers 21*a* and 21*b* using a parameter. Then, the mismatch compensation can be performed by adding or subtracting the mismatch compensation amount remaining after the correction to or from one of the modulation signals to the DACs 17*a* and 17*b*.

In the receiving part 2C also, the mismatch between the I signal and the Q signal due to the receiving quadrature mixers 12*a* and 12*b* can be compensated for using a parameter.

According to the present embodiment, in the receiving part 2C and the transmitting part 3C, the DC offset can be precisely compensated for as in the first embodiment. Furthermore, according to the present embodiment, the mismatch between the I signal and the Q signal can be compensated for.

Although the I signal path and the Q signal path share the switch 14, the VGA 15 and the ADC 16 in the receiving part 2 in the configuration shown in FIG. 6, the present invention is not limited to this configuration.

For example, the receiving quadrature mixers (quadrature demodulators) 12a and 12b may produce a baseband I signal and a baseband Q signal, and the I signal and the Q signal may be output to the controlling circuit 4 via a pair of switches 14a and 14b, a pair of VGAs 15a and 15b, and a pair of ADCs 16a and 16b, respectively (these reference numerals are not shown but given for clarity).

Furthermore, while the configuration has been described as an application of the third embodiment, the second embodiment can also be applied to the configuration. In this case, the effect of preventing the input range of the ADC 16 from being narrowed down can also be provided.

Furthermore, when the mismatch between the I signal and the Q signal is compensated for, the precision of compensation of the mismatch can be improved by compensating for not only the amplitude mismatch but also a phase mismatch (a phase shift from the orthogonal state).

By the way, a wireless communication comprises a radio communication, an infrared communication and an optical communication.

Other embodiments, such as a combination of the embodiments described above, are also included in the present invention.

Having described the embodiments of the invention referring to the accompanying drawings, it should be understood that the present invention is not limited to those precise embodiments and various changes and modifications thereof could be made by one skilled in the art without departing from the spirit or scope of the invention as defined in the appended claims.

What is claimed is:

1. A wireless transceiver, comprising:
    a receiving part that has an amplifying circuit that amplifies a received signal and an analog-to-digital converting circuit that converts the signal amplified by the amplifying circuit from analog to digital;
    a transmitting part that has a plurality of circuit blocks having different functions for transmitting a signal by wireless;
    a switch that performs switching among output signals of the circuit blocks forming the transmitting part for selective input thereof to the amplifying circuit;
    a DC offset compensating part capable of compensating for a DC offset occurring in the amplifying circuit; and
    a controlling circuit that performs control to cancel or reduce a DC offset occurring in each of the plurality of circuit blocks based on a digital signal output from the analog-to-digital converting circuit when the output signal of each of the plurality of circuit blocks forming the transmitting part is selectively input to the amplifying circuit,
    wherein the DC offset compensating part has an offset canceling part that holds a state in which a DC offset occurring in the amplifying circuit, when a signal is input to the amplifying circuit, is canceled.

2. The wireless transceiver according to claim 1, wherein the controlling circuit performs setting of a parameter for each of the plurality of circuit blocks forming the transmitting part so that the DC offset occurring in the circuit block is minimized and performs control of at least one circuit block.

3. The wireless transceiver according to claim 2, further comprising:
    a compensating part that compensates for a mismatch that occurs between an I signal path and a Q signal path.

4. The wireless transceiver according to claim 2, wherein the controlling circuit compensates for a residual DC offset of the transmitting part that is not cancelled by the DC offset minimization by the parameter setting, by using a compensation amount of a reverse polarity.

5. The wireless transceiver according to claim 2, wherein the wireless transceiver has a digital-to-analog converting circuit that converts transmission data from the controlling circuit from digital to analog as one of the plurality of circuit blocks forming the transmitting part, and the controlling circuit supplies a compensation value for canceling a residual DC offset, that is not cancelled by the DC offset minimization by the parameter setting, of the transmitting part to an input terminal of the digital-to-analog converting circuit.

6. The wireless transceiver according to claim 1, further comprising:
    a compensating part that compensates for a mismatch that occurs between an I signal path and a Q signal path.

7. The wireless transceiver according to claim 1, wherein the DC offset compensating part has a digital DC offset canceling circuit, in which a value set for canceling the DC offset is a digital value, as the offset canceling part.

8. The wireless transceiver according to claim 1, wherein the DC offset compensating part has a digital-to-analog converting circuit as the offset canceling part, and the controlling circuit sets a digital value for DC offset canceling from a setting register provided therein into the digital-to-analog converting circuit.

9. A wireless transceiver, comprising:
    a receiving part that has an amplifying circuit that amplifies a received signal and an analog-to-digital converting circuit that converts the signal amplified by the amplifying circuit from analog to digital;
    a transmitting part that has a plurality of circuit blocks having different functions for transmitting a signal by wireless;
    a switch that performs switching among output signals of the circuit blocks forming the transmitting part for selective input thereof to the amplifying circuit;
    a DC offset compensating part capable of compensating for a DC offset occurring in the amplifying circuit; and
    a controlling circuit that performs control to cancel or reduce a DC offset occurring in each of the plurality of circuit blocks based on a digital signal output from the analog-to-digital converting circuit when the output signal of each of the plurality of circuit blocks forming the transmitting part is selectively input to the amplifying circuit,
    wherein the controlling circuit performs setting of a parameter for each of the plurality of circuit blocks forming the transmitting part so that the DC offset occurring in the circuit block is minimized and performs control of at least one circuit block.

10. The wireless transceiver according to claim 9, further comprising:
    a compensating part that compensates for a mismatch that occurs between an I signal path and a Q signal path.

11. The wireless transceiver according to claim 9, wherein the controlling circuit compensates for a residual DC offset of the transmitting part that is not cancelled by the DC offset minimization by the parameter setting, by using a compensation amount of a reverse polarity.

12. The wireless transceiver according to claim 9, wherein the wireless transceiver has a digital-to-analog converting circuit that converts transmission data from the controlling circuit from digital to analog as one of the plurality of circuit blocks forming the transmitting part, and the controlling circuit supplies a compensation value for canceling a residual DC offset, that is not cancelled by the DC offset minimization by the parameter setting, of the transmitting part to an input terminal of the digital-to-analog converting circuit.

13. A wireless transceiver, comprising:
a receiving part that has an amplifying circuit that amplifies a received signal and an analog-to-digital converting circuit that converts the signal amplified by the amplifying circuit from analog to digital;
a transmitting part that has a plurality of circuit blocks having different functions for transmitting a signal by wireless;
a switch that performs switching among output signals of the circuit blocks forming the transmitting part for selective input thereof to the amplifying circuit;
a DC offset compensating part capable of compensating for a DC offset occurring in the amplifying circuit; and
a controlling circuit that performs control to cancel or reduce a DC offset occurring in each of the plurality of circuit blocks based on a digital signal output from the analog-to-digital converting circuit when the output signal of each of the plurality of circuit blocks forming the transmitting part is selectively input to the amplifying circuit,
wherein the DC offset compensating part connects an input terminal of the amplifying circuit to the ground via the switch, performs setting of a gain of the amplifying circuit, fetches a digital value produced by analog-to-digital conversion by the analog-to-digital converting circuit for the set gain, measures and stores the digital value as a DC offset value, and compensates for the DC offset of the amplifying circuit in accordance with a gain actually used.

14. The wireless transceiver according to claim 13, wherein the DC offset compensating part connects the input terminal of the amplifying circuit to a signal source having no DC offset via the switch when the DC offset value of the amplifying circuit is measured.

15. The wireless transceiver according to claim 13, wherein the DC offset compensating part is capable of measuring the value of a small DC offset equal to or lower than the resolution of the analog-to-digital converting circuit by setting the gain of the amplifying circuit at a large value within a predetermined range when the gain of the amplifying circuit is set and the DC offset is measured.

16. A wireless transceiver, comprising:
a receiving part that has an amplifying circuit that amplifies a received signal and an analog-to-digital converting circuit that converts the signal amplified by the amplifying circuit from analog to digital;
a transmitting part that has a plurality of circuit blocks having different functions for transmitting a signal by wireless;
a switch that performs switching among output signals of the circuit blocks forming the transmitting part for selective input thereof to the amplifying circuit;
a DC offset compensating part capable of compensating for a DC offset occurring in the amplifying circuit; and
a controlling circuit that performs control to cancel or reduce a DC offset occurring in each of the plurality of circuit blocks based on a digital signal output from the analog-to-digital converting circuit when the output signal of each of the plurality of circuit blocks forming the transmitting part is selectively input to the amplifying circuit,
wherein, in a case in which each of the plurality of circuit blocks forming the transmitting part including a plurality of circuit elements that have different characteristics and are switchably used, the controlling circuit performs control to minimize the DC offset of the circuit block by performing control to switch among the circuit elements.

17. A wireless transceiver, comprising:
a receiving part that has an amplifying circuit that amplifies a received signal and an analog-to-digital converting circuit that converts the signal amplified by the amplifying circuit from analog to digital;
a transmitting part that has a plurality of circuit blocks having different functions for transmitting a signal by wireless;
a switch that performs switching among output signals of the circuit blocks forming the transmitting part for selective input thereof to the amplifying circuit;
a DC offset compensating part capable of compensating for a DC offset occurring in the amplifying circuit;
a controlling circuit that performs control to cancel or reduce a DC offset occurring in each of the plurality of circuit blocks based on a digital signal output from the analog-to-digital converting circuit when the output signal of each of the plurality of circuit blocks forming the transmitting part is selectively input to the amplifying circuit, and
a compensating part that compensates for a mismatch that occurs between an I signal path and a Q signal path,
wherein the compensating part compensates for a mismatch in amplitude or phase between two signals in an orthogonal phase relationship in the transmitting part.

* * * * *